US012571501B2

(12) United States Patent
Krumnow et al.

(10) Patent No.: US 12,571,501 B2
(45) Date of Patent: Mar. 10, 2026

(54) SEALED AND THERMALLY INSULATING TANK

(71) Applicant: GAZTRANSPORT ET TECHNIGAZ, Saint Remy les Chevreuse (FR)

(72) Inventors: Thomas Krumnow, Saint Remy les Chevreuse (FR); Erwan Michaut, Saint Remy les Chevreuse (FR); Catherine Boucard, Saint Remy les Chevreuse (FR); Camille Gourmelen, Saint Remy les Chevreuse (FR); Fabien Pesquet, Saint Remy les Chevreuse (FR)

(73) Assignee: GAZTRANSPORT ET TECHNIGAZ, Saint Remy les Chevreuse (FR)

( * ) Notice: Subject to any disclaimer, the term of this patent is extended or adjusted under 35 U.S.C. 154(b) by 558 days.

(21) Appl. No.: 18/005,164

(22) PCT Filed: Jul. 13, 2021

(86) PCT No.: PCT/FR2021/051302
§ 371 (c)(1),
(2) Date: Jan. 11, 2023

(87) PCT Pub. No.: WO2022/013497
PCT Pub. Date: Jan. 20, 2022

(65) Prior Publication Data

US 2023/0258299 A1 Aug. 17, 2023

(30) Foreign Application Priority Data

Jul. 16, 2020 (FR) .................................... 2007482

(51) Int. Cl.
*F17C 13/06* (2006.01)
*B63B 25/16* (2006.01)
(Continued)

(52) U.S. Cl.
CPC .............. *F17C 3/027* (2013.01); *B63B 25/16* (2013.01); *B63B 27/24* (2013.01); *F17C 1/12* (2013.01);
(Continued)

(58) Field of Classification Search
CPC .. F17C 3/00; F17C 3/027; F17C 13/00; F17C 13/06; F17C 1/00; F17C 1/12;
(Continued)

(56) References Cited

U.S. PATENT DOCUMENTS 10,208,895 B2 * 2/2019 Chun ...................... F17C 3/027
2015/0033769 A1 2/2015 Chun et al.

FOREIGN PATENT DOCUMENTS

EP 2 792 590 A1 10/2014
KR 10-2012-0013257 A 2/2012

OTHER PUBLICATIONS

International Search Report issued Oct. 26, 2021 in PCT/FR2021/051302, filed on Jul. 13, 2021, 2 pages.

* cited by examiner

*Primary Examiner* — Lars A Olson
(74) *Attorney, Agent, or Firm* — Oblon, McClelland, Maier & Neustadt, L.L.P.

(57) ABSTRACT

A sealed and thermally insulating tank for transporting and/or storing liquefied natural gas includes a load-bearing structure and a storage structure surrounded by the load-bearing structure. The storage structure includes a first portion and a second portion that are sealed with respect to one another, the first portion and the second portion extending in one and the same plane which is parallel to the load-bearing structure. The tank includes a closure device arranged in the thickness of the storage structure. The closure device includes a first closure member and a second closure member that cooperate with one another to separate
(Continued)

the first portion from second portion. One of the closure members includes a first part and a second part that extend in intersecting planes. One of the parts is connected to one of the portions by a fastening device that is arranged in the thickness of the storage structure.

18 Claims, 2 Drawing Sheets

(51) Int. Cl.
*B63B 27/24* (2006.01)
*F17C 1/12* (2006.01)
*F17C 3/02* (2006.01)

(52) U.S. Cl.
CPC ...... *F17C 13/06* (2013.01); *F17C 2201/0157* (2013.01); *F17C 2203/0358* (2013.01); *F17C 2203/0643* (2013.01); *F17C 2203/0651* (2013.01); *F17C 2223/0161* (2013.01)

(58) Field of Classification Search
CPC ...... F17C 2201/0157; F17C 2203/0358; F17C 2203/0643; F17C 2203/0651; F17C 2223/0161; B63B 19/00; B63B 25/00; B63B 25/16; B63B 27/00; B63B 27/24
USPC ........................................................ 114/74 R
See application file for complete search history.

SEALED AND THERMALLY INSULATING TANK

The present invention relates to the field of liquefied natural gas storage tanks, in particular onshore liquefied natural gas storage tanks.

Liquefied natural gas is generally transported by sea in storage tanks fitted on transport ships. Natural gas is kept in liquid form to increase the amount of natural gas transported per tank, the volume of one liter of natural gas in liquid form being much lower than the volume of one liter of natural gas in gaseous form. These tanks keep the liquefied natural gas at a very low temperature, and more precisely at a temperature below −163° C., the temperature at which natural gas is in liquid form at atmospheric pressure.

To load and/or unload the tanks of these liquefied natural gas transport ships, an onshore liquefied natural gas storage tank is installed at a port. This is generally fitted out such that liquefied natural gas transport ships can come and restock and/or unload their cargo of liquefied natural gas. Such onshore storage tanks are equipped with elements passing through one of the walls of these onshore tanks, such as for example a pipe, thus allowing communication between a liquefied natural gas loading and/or unloading facility and an internal volume of the onshore tank in which the liquefied natural gas is stored and/or unloaded.

As is known, such onshore tanks include a storage structure intended to contain the liquefied natural gas and a supporting structure surrounding the storage structure. The walls of the storage structure generally include at least a sealed and thermally insulating secondary space and a sealed and thermally insulating primary space resting on the secondary space and configured to be in contact with the liquefied natural gas contained in the tank. In some cases, the storage structure may comprise a wall having a first portion composed of at least the secondary space and the primary space and a second portion comprising a sealed and thermally insulating layer in contact on the one hand with the supporting structure and on the other hand with liquefied natural gas. This type of fitting may be put in place to facilitate the passage of a through element through the wall, and more precisely at the sealed and thermally insulating layer.

At the junction between the first portion and the second portion, a device for closing off the secondary space of the first portion is generally installed to seal the secondary space from the second portion. However, such closure devices are generally complicated to install and/or require considerable precision when assembling the walls of the storage structure of the tank. Since such precision is often difficult to achieve for large steel or concrete tanks, a space exists between the closure device and the components of the secondary space, which must be filled to limit thermal bridges.

In this context, the present invention proposes an alternative to the already existing solutions by virtue of a closure device that adapts to the position of the secondary space during assembly of the wall of the storage structure.

To this end, the main subject matter of the present invention is a sealed and thermally insulating tank for the transport and/or storage of liquefied natural gas, comprising at least a supporting structure and a storage structure surrounded by the supporting structure, the storage structure comprising at least a first portion and a second portion which are sealed relative to one another, the first portion and the second portion extending at least partially in the same plane parallel to the supporting structure, the storage structure having a thickness from the outside toward the inside of the tank in a direction perpendicular to the plane of the supporting structure, the tank comprising a closure device arranged at least partially in the thickness of the storage structure, the closure device comprising at least a first closure member and a second closure member configured to interact with one another in such a way as to separate the first portion from the second portion, at least one of the closure members comprising a first part and a second part extending in secant planes, characterized in that at least one of the parts of one and/or the other of the closure members is connected to at least one of the portions by a securing device arranged in the thickness of the storage structure.

The tank storage structure comprises a plurality of walls, each of these walls comprising at least the first portion and the second portion. According to the invention, one of the walls of the plurality of walls comprises a part at which the first portion and the second portion extend in the same plane parallel to the supporting structure. Note in this case that the first portion and the second portion are aligned relative to one another, while their internal volumes remain independent, since the first portion is sealed relative to the second portion.

The term “thickness” means the dimension of the element in question measured in a direction perpendicular to the supporting structure of the first portion and of the second portion, the thickness possibly being a part of one or the other of the portions lying in this direction. Moreover, at least one of the parts of one and/or the other of the closure members extends in the thickness, in an area located between the first portion and the second portion, the securing device securing same to at least one of the portions in their thickness.

According to an optional feature of the invention, at least one of the closure members has an “L” profile seen in a section plane passing through the closure device.

According to an optional feature of the invention, the first closure member and the second closure member have an “L” profile seen in a section plane passing through the closure device. According to another optional feature of the invention, the first part of one of the closure members extends perpendicularly with respect to the second part of this closure member.

According to another optional feature of the invention, at least one of the closure members is secured to the other closure member by at least one weld bead. The weld bead also ensures a seal between these two closure members, in such a way as to prevent any exchange of fluid between the first portion and the second portion.

According to another optional feature of the invention, the second part of one of the closure members is secured to the second part of the other closure member by a weld bead.

According to another feature of the invention, the first closure member and the second closure member are positioned head to tail relative to one another.

According to another feature of the invention, the second part of the first closure member extends parallel to the second part of the second closure member, the second parts of the closure members being joined to one another, the two other parts of the closure members extending away from one another in planes parallel to one another.

According to another optional feature of the invention, the first closure member and/or the second closure member of the closure device are elastically deformable. Elastically deformable means that each of the closure members may see its shape change under the exertion of pressure, the closure members then returning to their initial shape when this pressure is no longer exerted. This feature allows the first and the second closure member to match the expansion or contraction of the first portion and/or of the second portion.

According to another feature of the invention, one of the closure members is connected to at least one of the portions by the securing device arranged in the thickness of the storage structure, the other closure member being connected to the supporting structure.

According to another optional feature of the invention, one of the closure members is connected to at least one of the portions by the securing device arranged in the thickness of the supporting structure, the supporting structure comprising an insert at which one or the other of the parts of the other closure member is secured.

According to another optional feature of the invention, the first portion comprises a secondary space and a primary space, the secondary space comprising, successively in the thickness direction from the outside toward the inside of the tank, a secondary thermally insulating barrier adapted to be in contact with the supporting structure and a secondary sealing membrane resting on the secondary thermally insulating barrier, the securing device extending at least partially into the secondary thermally insulating barrier, the primary space comprising, successively in the thickness direction from the outside toward the inside of the tank, a primary thermally insulating barrier which rests on the secondary sealing membrane and a primary sealing membrane resting on the primary thermally insulating barrier and intended to be in contact with the fluid contained in the tank, the second portion comprising a thermally insulating wall adapted to be in contact with the supporting structure and an impermeable membrane resting on the thermally insulating wall and intended to be in contact with the fluid contained in the tank.

According to this feature, the tank therefore comprises a part of its wall where the primary space and the secondary space are superimposed, and a part of its wall only provided with the sealed and thermally insulating layer, the secondary space then being closed off by the closure device according to the invention. The volume of the second portion is in communication with the volume of the primary space of the first portion of the supporting structure, in such a way that this common volume may be traversed by the same inerting fluid, in particular dinitrogen.

According to another optional feature of the invention, the secondary space comprises a securing plate arranged between the secondary thermally insulating barrier and the primary space, the first part of the first closure member being connected to the securing plate by at least one weld bead, the second part of the first closure member being connected to the secondary thermally insulating barrier by the securing device arranged in the thickness of the storage structure. According to another optional feature of the invention, the first part of the first closure member is connected to a securing plate by at least one weld bead, the securing plate and the first closure member being configured to be mounted in one piece on the secondary thermally insulating barrier.

According to another optional feature of the invention, the supporting structure comprises an insert, the first part of the second closure member being connected to the insert by at least one weld bead, the second part of the second closure member being connected to the secondary thermally insulating barrier by the securing device arranged in the thickness of the storage structure.

According to another optional feature of the invention, at least the secondary space comprises at least one thermally insulating self-supporting panel having an internal face oriented toward the inside of the tank, an external face oriented toward the outside of the tank, and a thickness face extending between the internal face and the external face of the self-supporting panel, the self-supporting panel of the secondary space adjacent to the first closure member comprising a chamfer connecting the internal face and the thickness face of the self-supporting panel.

According to an optional feature of the invention, the thickness face of the self-supporting panel comprises a plywood panel which receives the securing device.

According to another optional feature of the invention, the first closure member comprises a bent part connecting the first part to the second part of the first closure member, the first closure member being positioned against the internal face and the thickness face of the self-supporting panel of the secondary space such that the bent part of the first closure member is arranged in line with the chamfer on the self-supporting panel.

The present invention also relates, as second subject matter, to a transport and/or storage unit comprising at least one tank according to any one of the preceding features, the transport and/or storage unit consisting of a ship, a barge, a reliquefaction unit, gasification unit, an onshore structure or a gravity platform.

The present invention also relates, as third subject matter, to a method for assembling the junction zone between a first portion and a second portion of the tank according to any one of the preceding features, the tank comprising a supporting structure surrounding the storage structure, the method comprising a first step in which the secondary thermally insulating barrier is fitted against the supporting structure.

According to one feature of the invention, the method for assembling a junction zone in the tank comprises a second step in which the second part of the first closure member is secured in a thickness of the secondary thermally insulating barrier by the securing device.

According to one feature of the invention, the secondary thermally insulating barrier comprises a securing plate, the method comprising a third step, in which the first part of the first closure member is secured to the secondary thermally insulating barrier at this securing plate by a weld bead.

According to one feature of the invention, the supporting structure comprises an insert, the method comprising a fourth step in which the second part of the second closure member is secured to the second part of the first closure member by a weld bead, and the first part of the second closure member is secured to the insert of the supporting structure by another weld bead.

According to one feature of the invention, the method for assembling a junction zone in the tank comprises a fifth step in which the secondary sealing membrane is fitted against the secondary thermally insulating barrier.

This fifth step of the method for assembling a junction zone in a tank may take place before or after the fourth step in said method.

According to one feature of the invention, the method for assembling a junction zone in the tank comprises a sixth step, in which the primary thermally insulating barrier is fitted against the secondary space, part of the primary thermally insulating barrier partially covering the first part of the first closure member, and the thermally insulating wall is fitted against the supporting structure at least in the main plane of extension of the secondary space, part of the thermally insulating wall being arranged in line with the first part of the second closure member along the thickness.

According to one feature of the invention, the method for assembling a junction zone in the tank comprises a seventh step, in which the primary sealing membrane and the impermeable membrane are fitted against the primary thermally insulating barrier and against the thermally insulating wall, respectively, the primary sealing membrane and the impermeable membrane extending in a common plane.

Lastly, the present invention relates, as fourth subject matter, to a method for loading or unloading liquefied gas contained in a tank according to any one of the preceding features, in which a cold liquid product is conveyed through insulated pipelines from or to a floating or onshore storage facility, to or from a tank according to any one of the preceding features.

Further features, details and advantages of the invention will become more clearly apparent from reading the following description, and from a number of exemplary embodiments provided by way of non-limiting indication, with reference to the appended schematic drawings, in which.

The features, variants and different embodiments of the invention may be combined with one another, in various combinations, as long as they are not mutually incompatible or mutually exclusive. In particular, variants of the invention can be contemplated that only comprise a selection of features that are described hereafter independently of the other features described, if this selection of features is sufficient to provide a technical advantage and/or to differentiate the invention from the prior art.

In the description below, the designations “longitudinal”, “transverse” and “vertical” refer to the orientation of a sealed and thermally insulating tank according to the invention. A longitudinal direction corresponds to a main direction of extension of the sealed and thermally insulating tank, this longitudinal direction being parallel to a longitudinal axis L of a coordinate system L, V, T shown in the figures. A transverse direction corresponds to a direction parallel to a transverse axis along which an end wall of the sealed and thermally insulating tank mainly extends, this transverse direction being parallel to a transverse axis T of the coordinate system L, V, T and this transverse axis T being perpendicular to the longitudinal axis L. Lastly, a vertical direction corresponds to a direction parallel to a vertical axis V of the coordinate system L, V, T, this vertical axis V being perpendicular to the longitudinal axis L and the transverse axis T.

Figure 1:
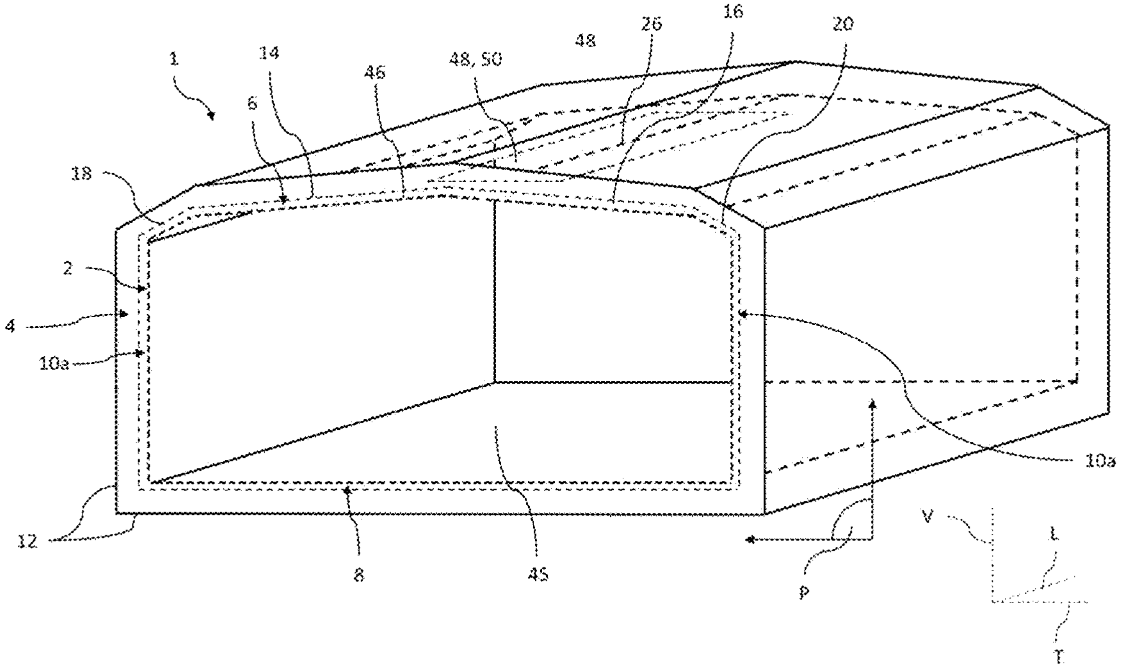
FIG. 1 is a perspective view of a tank according to the invention.

FIG. 1 shows a sealed and thermally insulating tank 1 generally in the shape of a rectangular parallelepiped. The tank 1 comprises a storage structure 2 and a supporting structure 4 surrounding the storage structure 2, the storage structure 2 being composed of layers.

The storage structure 2 is configured to contain and/or store a fluid, and more particularly a cryogenic liquid, such as for example liquefied natural gas or liquefied petroleum gas. The storage structure 2 comprises a plurality of walls resting against the supporting structure 4. The latter is configured to support the plurality of walls when the tank 1 is at least partially filled with this fluid, this fluid exerting pressure on each of the walls of the plurality of walls, this pressure being taken up by the supporting structure 4.

According to a non-limiting example, this type of tank 1 is used in the onshore storage of liquefied natural gas to contain liquefied natural gas and/or as a point of loading and/or unloading of a maritime transport vessel, such as for example a gravity platform. “Gravity platform” means that the tank is at least partially submerged, in a port for example, and that a liquefaction and/or gasification unit is installed partially or fully in the ceiling of the tank. More specifically, the tank 1 may interact with the liquefaction and/or gasification unit such that the tank stores liquefied gas coming from the liquefaction unit and/or supplies the gasification unit with liquefied gas. The supporting structure 4 may then comprise at least concrete.

Furthermore, this tank 1 may also be used as a tank 1 for transporting liquefied natural gas, or even as a fuel tank for a ship and/or a barge. Lastly, this tank 1 may also be used in maritime transport, as a tank 1 for transporting liquefied natural gas. In such a case, the supporting structure 4 comprises at least one hull of the floating structure, such as a metal hull for example.

As shown here in FIG. 1, the tank 1 extends mainly in a longitudinal direction L. The plurality of walls of the storage structure 2 comprises a ceiling wall 6 and a bottom wall 8 each extending generally in a plane parallel to the longitudinal direction L and to a transverse direction T. The storage structure 2 also comprises a plurality of side walls **10*a*, 10*b* extending at least in a vertical direction V between the bottom wall 8 and the ceiling wall 6. The plurality of side walls 10*a*, 10*b* in this case comprises two longitudinal walls 10*a* parallel to one another and two end walls 10*b* parallel to one another. The longitudinal walls 10*a* extend in the longitudinal direction L, the end walls 10*b* extending for their part in the transverse direction T between the two longitudinal walls 10*a***.

The supporting structure 4 takes the shape of the storage structure 2, surrounding the latter. To this end, the supporting structure 4 comprises a plurality of partitions 12, each of these partitions 12 advantageously extending parallel to one of the walls of the plurality of walls. To facilitate understanding of the invention, the two end walls **10*b* of the storage structure 2, and the partition of the supporting structure 4 adjacent to this end wall are not shown in FIG. 1**.

As shown in FIG. 1, the ceiling wall 6 comprises two separate spaces, a first portion 46 of which is composed of at least two spaces which are sealed relative to one another, and a second portion 48 being composed of at least a sealed and thermally insulating layer 50 in contact with the supporting structure 4, while contributing to defining an internal volume 45 of the tank 1.

The tank 1, and more particularly the storage structure 2, is configured to keep the liquefied natural gas at a temperature below −163° C. To this end, and as shown in FIG. 2, each wall of the storage structure 2, along with the first portion 46 of the ceiling wall 6, comprise successively in the thickness direction from the outside toward the inside of the tank 1, a secondary space 28 and a primary space 30, thermally insulating and sealed relative to one another.

Figure 2:
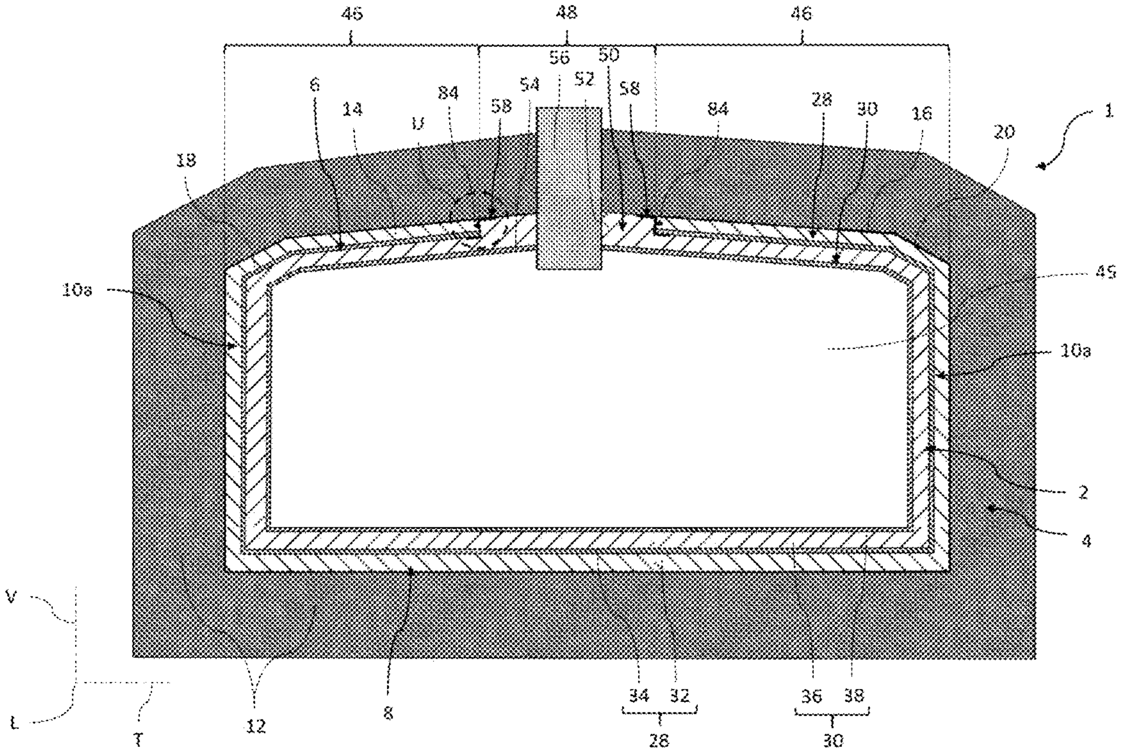
FIG. 2 is a cross section through the tank according to FIG. 1.

According to the invention and as shown in FIG. 2, the storage structure 2 comprises a closure device 58 connected to at least one of the portions 46, 48 by a securing device 84 arranged in the thickness of the storage structure 2. More particularly, the securing device 84 is arranged in the secondary space 28 of the first portion 46.

A more detailed description of the closure device 58 and of the securing device 84 will be provided following the description of the various components of each of the primary 30 and secondary 28 spaces, and of the components of the sealed and thermally insulating layer 50, with reference to FIG. 2 which is a section through the tank 1 along a plane P shown in FIG. 1.

More specifically, the secondary space 28 in the first portion 46 of the ceiling wall comprises, successively from the supporting structure 4 toward the primary space 30, a secondary thermally insulating barrier 32, a secondary sealing membrane 34, the primary space 30 for its part comprising, successively from the secondary space 28 toward the inside of the tank 1, a primary thermally insulating barrier 36 and a primary sealing membrane 38.

The secondary thermally insulating barrier 32 is a juxtaposition of self-supporting panels, which are heat-insulating, each self-supporting panel comprising, successively from the supporting structure 4 toward the secondary sealing membrane 34, a first plywood plate, a thermal insulation block and a second plywood plate. The thermal insulation block extends between the plywood plates and may be made of a synthetic alveolar material, such as polyurethane foam for example, allowing efficient and homogeneous thermal insulation.

The secondary thermally insulating barrier 32, and more particularly the second plywood plate, is secured to the secondary sealing membrane 34, for example by adhesive bonding.

Figure 3:
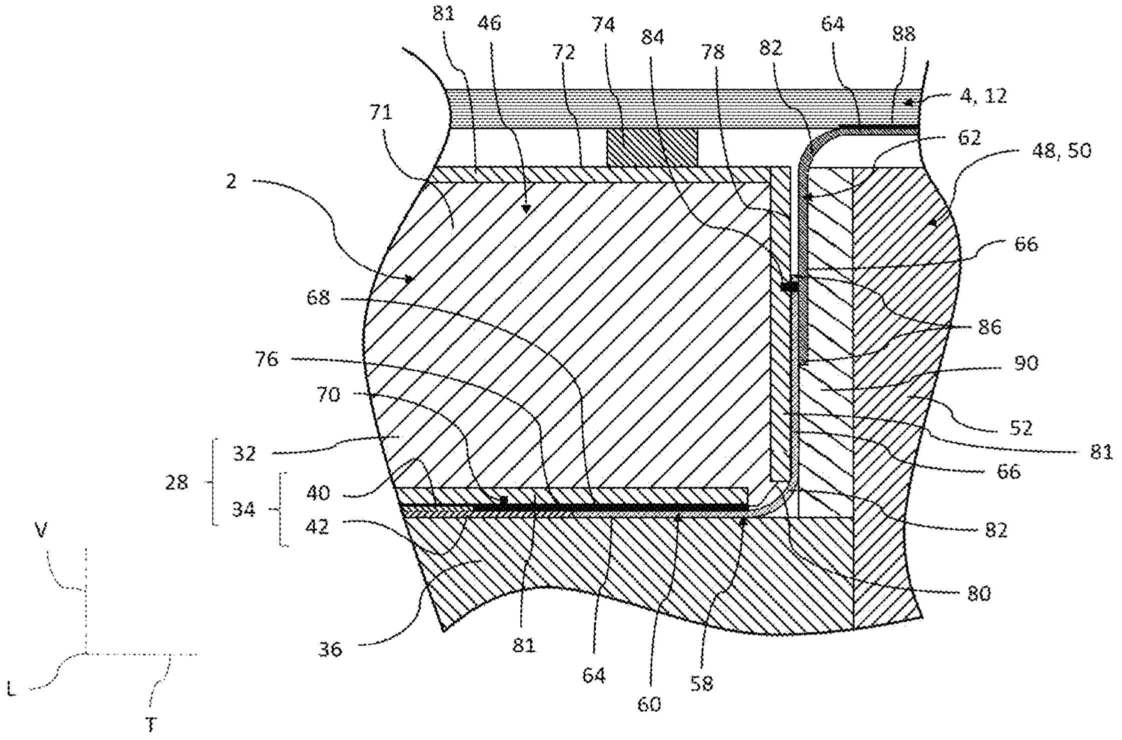
FIG. 3 is a cross section through a closure device arranged between a first portion and a second portion of a ceiling wall of the tank according to FIG. 1.
Figure 4:
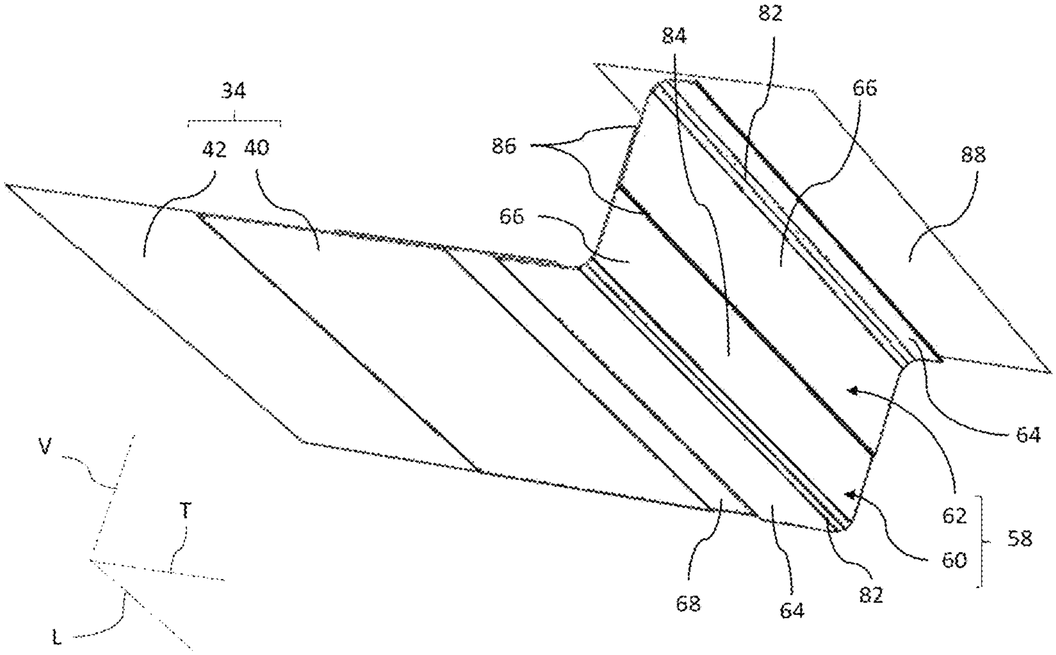
FIG. 4 is a perspective view of the closure device according to FIG. 3, viewed from inside the tank.

The secondary sealing membrane 34 comprises a rigid secondary sealing membrane 40 and a flexible secondary sealing membrane 42, as can be seen more particularly in FIGS. 3 and 4.

As shown in FIG. 2, the primary thermally insulating barrier 36 has the same components as the secondary thermally insulating barrier 32, these same components being superimposed in a similar manner. There is thus a thermal insulation block flanked in the thickness direction by two plywood plates. Reference may be made to the foregoing for the composition and function of each of these elements.

During assembly of the sealed and thermally insulating tank 1, the walls of the storage structure 2 are assembled by juxtaposition of the self-supporting panels. These assembly panels are then covered with the primary sealing membrane 38, which may be made of corrugated stainless steel. Note that, alternatively, the primary sealing membrane is for example made of sheet Invar®.

The primary sealing membrane 38 is intended to be in contact with the fluid contained in the tank 1 while helping to define the internal volume 45 of the tank 1.

The second portion 48 comprises, in the thickness direction from the supporting structure 4 toward the internal volume 45 of the tank 1, a thermally insulating wall 52 resting against the supporting structure 4 and an impermeable membrane 54 resting on the thermally insulating wall 52 and intended to be in contact with the fluid contained in the tank 1.

The thermally insulating wall 52 has the same composition as the primary and secondary thermally insulating barriers 32, 36 of the primary and secondary spaces 28, 30, and therefore comprises at least one thermal insulation block extending between two plywood plates, one of the plates being secured to the supporting structure 4, by adhesive bonding for example.

The thermally insulating wall 52 of the sealed and thermally insulating layer 50 has a thickness at least equal to the sum of the thickness of the primary thermally insulating barrier 36 and the thickness of the secondary space 28 measured in the first portion 46. The thickness of the thermally insulating wall 52 is measured along an axis perpendicular to a plane in which the second portion 48 mainly extends, the thickness of the primary thermally insulating barrier 36 and the thickness of the secondary space 28 being measured in a direction perpendicular to a plane in which the first portion 46 mainly extends. In other words, the thickness of the thermally insulating wall 52 is the sum of the thicknesses of the secondary thermally insulating barrier 32, the secondary sealing membrane 34 and the primary thermally insulating barrier 36.

Furthermore, and according to the example shown here, the thermally insulating wall 52 of the sealed and thermally insulating layer 50 is in aeraulic communication with the primary thermally insulating barrier 36 of the primary space 30. To be specific, an inerting fluid circulates in the primary thermally insulating barrier 36 of the primary space 30 and may also pass through the thermally insulating wall 52 of the sealed and thermally insulating layer 50.

The impermeable membrane 54 is secured to the thermally insulating wall 52 and has the same composition as the primary sealing membrane 38, that is to say corrugated stainless steel or sheet Invar®. The impermeable membrane 54 is welded at at least one of its ends to the primary sealing membrane 38, ensuring continuity of the ceiling wall 6 between the first portion 46 and the second portion 48.

According to the example shown in FIG. 2, the impermeable membrane 54 of the sealed and thermally insulating layer 50 and the primary sealing membrane 38 of the primary space 30 extend at least partially in a common plane, the impermeable membrane 54 extending the primary sealing membrane 38 of the primary space 30 onto the sealed and thermally insulating layer 50 in the second portion 48.

According to the example shown in FIG. 2, the storage structure also comprises at least one closure device 58 for the secondary space 28 arranged at at least one junction between the first portion 46 and the second portion 48 of the ceiling wall 6. The closure device 58 is described with reference to FIGS. 3 and 4.

The shape of the ceiling wall 6 of the supporting structure 2 will now be described with reference to FIGS. 1 and 2.

The ceiling wall 6 is composed of at least four distinct facets 14, 16, 18, 20, each of these facets 14, 16, 18, 20 extending in a plane secant to the planes in which the other facets 14, 16, 18, 20 lie. The four facets 14, 16, 18, 20 of the ceiling wall 6 are symmetrical in pairs, forming two central facets 14, 16 and two outer facets 18, 20. The storage structure 2 comprises a plane of symmetry which passes through a vertex 26 of the tank and which extends in a longitudinal and vertical plane, one central facet and one outer facet being symmetrical with the other central facet and the other outer facet.

In the example shown in FIG. 2, the second portion 48 of the ceiling wall 6 is formed in at least one of the central facets 14, 16 of the ceiling wall 6. However, a second portion 48 extending only over one of the central facets 14, 16 or only over one of the outer facets 18, 20 would not depart from the scope of the invention.

According to the example shown here, the tank 1 comprises a pipe 56 passing through at least the supporting structure 4 and the storage structure 2 in the second portion 48 of the ceiling wall 6, at the vertex 26 of the central facets 14, 16.

The closure device 58 for the secondary space 28 arranged at at least one junction between the first portion 46 and the second portion 48 of the ceiling wall will now be described in more detail with reference to FIGS. 3 and 4, FIG. 3 being a detail view of a junction zone U between the first portion 46 and the second portion 48 shown in FIG. 2.

The closure device 58, as shown in FIG. 3, comprises a first closure member 60 and at least one second closure member 62 configured to interact with one another in such a way as to separate the secondary space 28 of the first portion 46 from the second portion 48.

According to an alternative embodiment, the first closure member 60 and/or the second closure member 62 comprise at least one securing plate 68 for securing to the secondary space 28. Note that the first closure member 60 and/or the second closure member 62 may form with this securing plate 68 a single piece before being mounted on the secondary space 28.

As shown in FIGS. 3 and 4, each of the closure members 60, 62 has an "L" profile seen in a cross-sectional plane of the ceiling wall, for example along the sectional plane of FIG. 2. Each closure member 60, 62 comprises a first part 64 and at least one second part 66 extending in secant planes.

As can be seen more particularly in FIG. 4, each closure member 60, 62 is a bent metal plate comprising the first part 64 and the second part 66, each plate extending at least in the longitudinal direction L of the tank 1. More specifically, the closure device 58 is made up of a succession of plates placed one after the other to form a closure strip for the secondary space 28. Moreover, the plates extend around the periphery of the second portion 48, that is to say over the entire perimeter of the second portion 48, and may thus extend mainly in the longitudinal L or transverse T directions.

The interaction of each of the parts 64, 66 of each of the closure members 60, 62 with certain components of the tank 1 will now be described.

As shown in FIG. 3, the first part 64 of the first closure member 60 extends in this case at least partially between the secondary space 28 and the primary space 30 of the first portion 46. The secondary thermally insulating barrier 32 has a zone for securing the first part 64 of the first closure member 60. To be specific, the secondary space 28 comprises a securing plate 68 to which is secured the first part 64 of the first closure member 60, this securing plate 68 lying in the extension of the secondary sealing membrane 34.

According to one alternative of the invention, the securing plate 68 and the first closure member 60 form a one-piece element, that is to say that the separation of one of the two elements would cause the destruction of one and/or both elements. Note that in this configuration, the first part 64 of the first closure member 60 is directly in contact with the secondary space 28, or even directly secured to the secondary space 28.

More specifically, and as shown in FIGS. 3 and 4, the securing plate 68 in this case extends the rigid secondary sealing membrane 40, the flexible secondary sealing membrane 42 at least partially covering the securing plate 68, in such a way as to ensure a seal between the securing plate 68 and the rigid secondary sealing membrane 40. The securing plate 68 is secured by a retention member 70, such as a screw or a rivet for example, to the secondary thermally insulating barrier 32. The first part 64 of the closure member is secured to the securing plate 68, for example by means of a weld bead, such that the first part 64 of the first closure member 60 is arranged at least between the securing plate 68 and the primary space 30.

Preferably, and according to an alternative embodiment, the rigid secondary sealing membrane 40 and the flexible secondary sealing membrane 42 at least partially cover the securing plate 68, in such a way as to ensure a seal between the securing plate 68 and the secondary sealing membrane 34. In this alternative, the rigid secondary sealing membrane 40 is partially bonded to the securing plate 68 with the flexible secondary sealing membrane 42 at least partially covering the securing plate 68 and the rigid secondary sealing membrane 40.

As shown in FIG. 3, the secondary thermally insulating barrier 32 comprises at least one thermally insulating self-supporting panel 71 having an external face 72 secured to the supporting structure 4 by a securing element 74, such as mastic for example, an internal face 76 to which the securing plate 68 of the secondary space 28 is secured, and a thickness face 78 extending between the external face 72 and the internal face 76 and facing the second portion 48 of the ceiling wall. Furthermore, each of the faces 72, 76, 78 of the self-supporting panel 71 includes a plywood plate 81. It is on or in these plywood plates that the retention member 70 and/or the securing device 84 are secured, in particular by screwing or riveting.

The self-supporting panel 71 has a chamfer 80 connecting the internal face 76 to the thickness face 78 of the secondary thermally insulating barrier 32. The first closure member 60 comprises a bent part 82 connecting the first part 64 to the second part 66 of the first closure member 60, the bent part 82 of the first closure member 60 being arranged in line with the chamfer 80 on the self-supporting panel 71, that is to say opposite this chamfer.

Furthermore, each closure member 60, 62 in this case comprises a bent part 82 connecting the first parts 64 to the respective second parts 66 of each of the closure members 60, 62. By virtue of this bent part 82, at least the first closure member 60 and the second closure member 62 of the closure device 58 are elastically deformable. The various components of the ceiling wall may be caused to retract and/or expand, for example owing to the movements of the swell or owing to a sudden change in temperature, in particular during the phase of loading or unloading of the tank according to the invention. The first closure member 60 and the second closure member 62 of the closure device 58 are configured to be able to adapt their shapes to the movements of the components of the ceiling wall. More specifically, each part 64, 66 of each closure member 60, 62 may move away from and toward one another under the effect of the stresses described above. According to the invention, at least one of the parts 64, 66 of one and/or the other of the closure members 60, 62 is connected to at least one of the portions 46, 48 by the securing device 84 arranged in the thickness of the storage structure 2. In other words, at least one of the parts 64, 66 of one and/or the other of the closure members 60, 62 is in contact with and secured by the securing device 84 to one of the portions 46, 48, at least one of the parts 64, 66 of one or the other of the closure members extending in a direction perpendicular to the main plane of extension of the portions 46, 48.

As shown here in FIG. 3, the first closure member 60 is positioned against the secondary thermally insulating barrier 32 such that the second part 66 of the first closure member 60 extends along the thickness face 78 of the secondary thermally insulating barrier 32. The second part 66 of the first closure member 60 is rigidly secured to the secondary thermally insulating barrier 32 on the thickness face 78 by the securing device 84 extending at least partially in the plywood plate 81 of the thickness face 78, the securing device 84 possibly being, for example, a screw or a rivet. Advantageously, the securing device 84 is a wood screw.

It will be understood from the above that the securing device 84 is installed at an end portion of the secondary thermally insulating barrier 32. In other words, the securing device 84 extends through the thickness face 78 of the self-supporting panel 71, the face extending between the external face 72 and the internal face 76 of said self-supporting panel, to secure the first closure member 60 to the self-supporting panel 71.

According to the example shown here in FIG. 3, the second part 66 of each closure member 60, 62 extends in a plane perpendicular to the planes in which the first parts 64 of the first and second closure member 60, 62 extend. The second part 66 of the first closure member 60 thus extends from the bent part 82 of the first closure member 60 toward the supporting structure 4, the second part 66 of the second closure member 62 extending from the bent part 82 of the second closure member 62 toward the internal volume of the tank. The second part 66 of each of the closure members 60, 62 comprises an end 86, the second part 66 of each of the closure members 60, 62 being in contact with the second part 66 of the other closure member 60, 62 at least over an area which extends between the end 86 of the second part 66 of the first closure member 60 and the end 86 of the second part 66 of the second closure member 62.

Note in this case that the second part 66 of the first closure member 60 is flanked on the one hand by the plywood plate 81 of the thickness face 78 and on the other hand by the second part 66 of the second closure member 62. Each closure member 60, 62 is secured to the other closure member 60, 62 by at least one weld bead. More specifically, the second part 66 of the second closure member 62 is secured to the second part 66 of the first closure member 60 by means, for example, of at least one weld bead made along the end 86 of the second part 66 of the first closure member 60 on the second part 66 of the second closure member 62.

In an alternative embodiment with respect to that described above, the second part 66 of the second closure member 62 is secured by the securing device 84 to the plywood plate 81 of the thickness face, the second part 66 of the first closure member 60 being for its part secured to the second part 66 of the second closure member 62. Thus, the second part 66 of the second closure member 62 is flanked on the one hand by the plywood plate 81 of the thickness face 78 and on the other hand by the second part 66 of the first closure member 60.

As shown in FIG. 3, the first part 64 of the second closure member 62 extends for its part at least partially between the sealed and thermally insulating layer 50 of the second portion 48 and the supporting structure 4. The first part 64 of the second closure member 62 is secured to the supporting structure 4. To this end, the supporting structure 4 comprises an insert 88, also visible in FIG. 4, against which the first part 64 of the second closure member 62 is secured.

According to one example of the invention, the insert 88 of the supporting structure is metal, the first part 64 of the second closure member 62 being secured to the insert 88 of the supporting structure 4 by at least one weld bead.

According to the example shown here in FIG. 3, the second parts 66 of the closure members 60, 62, part of the thermally insulating wall 52 and part of the primary thermally insulating barrier 36 help delimit a cavity 90 filled with a thermally insulating component, such as glass wool, for example.

The invention also relates to a method for assembling the junction zone U of the tank 1 comprising at least seven steps carried out chronologically one after the other. However, other assembly steps not listed may be interspersed between these seven steps. This assembly method comprises a first step in which the secondary thermally insulating barrier 32 is assembled against the supporting structure 4 of the tank 1. To this end, at least one self-supporting panel 71 is preassembled, this self-supporting panel 71 being mainly composed of a thermal insulation block flanked by two plywood plates, this self-supporting panel 71 being adhesively bonded to the supporting structure 4, with mastic for example.

The method for assembling the junction zone U comprises a second step in which the first part 64 of the first closure member 60 is fitted against the securing plate 68 of the secondary thermally insulating barrier 32, the securing plate 68 being positioned on the internal face 76 of the self-supporting panel 71, the second part 66 of the first closure member 60 being fitted against the thickness face 78 of the self-supporting panel 71 forming the secondary thermally insulating barrier 32. The second part 66 of the first closure member 60 is then secured to the thickness face 78 of the self-supporting panel 71 of the secondary thermally insulating barrier 32 by the securing device 84.

The method for assembling the junction zone U comprises a third step in which the first part 64 of the first closure member 60 is secured to the securing plate 68 of the secondary thermally insulating barrier 32, for example by means of a weld bead.

The method for assembling the junction zone U comprises a fourth step in which the first part 64 of the second closure member 62 is fitted against the supporting structure 4, the second part 66 of the second closure member 62 being fitted against the second part 66 of the first closure member 60. The second part 66 of the second closure member 62 is then secured to the second part 66 of the first closure member 60 for example by means of a weld bead. The first part 64 of the second closure member 62 is for its part secured to the insert 88 of the supporting structure 4, for example by means of another weld bead. These last two sub-steps may be carried out either one before the other.

The method for assembling the junction zone U includes a step in which the secondary sealing membrane 34 is fitted against the secondary thermally insulating barrier 32. This step may be carried out between the first and any of the other steps of the method. More specifically, the rigid secondary sealing membrane 40 is adhesively bonded against the secondary thermally insulating barrier 32 such that the rigid secondary sealing membrane 40 is in the same plane as the securing plate 68 of the secondary thermally insulating barrier 32. The flexible secondary sealing membrane 42 is then adhesively bonded against the rigid secondary sealing membrane 40 and at least partially against the securing plate 68 of the secondary thermally insulating barrier 32, thus covering the junction between the secondary sealing membrane 34 and securing plate 68. The method for assembling the junction zone U comprises a sixth step in which the primary thermally insulating barrier 36 is fitted against the secondary space 28, part of the primary thermally insulating barrier 36 partially covering the first part 64 of the first closure member 60. Next, the thermally insulating wall 52 is fitted against the storage structure 2 at least in the same main plane of extension as that of the first portion 46, part of the thermally insulating wall 52 partially covering the first part 64 of the second closure member 62.

The method for assembling the junction zone U comprises a seventh step in which the primary sealing membrane 38 and the impermeable membrane 54 are fitted against the primary thermally insulating barrier 36 and against the thermally insulating wall 52, respectively. The primary sealing membrane 38 and the impermeable membrane 54 cover the junction between the primary thermally insulating barrier 36 and the thermally insulating wall 52. The primary thermally insulating barrier 36 and the thermally insulating wall 52 are in communication with one another forming a common volume through which an inerting fluid, such as dinitrogen, passes. The sealing membrane 38 and the impermeable membrane 54 thus render this common volume, but also the first portion 46 and the second portion 48, sealed against the fluid circulating and/or stored in the internal volume 45 of the tank 1.

The invention also relates to a method for loading or unloading liquefied gas contained in the tank described above, in which a cold liquid product is conveyed through insulated pipelines from or to a floating or onshore storage facility, to or from a tank 1 as described herein. The invention should not be limited to the means and configurations described and illustrated herein, however, but also extends to any equivalent means and any equivalent configuration and to any technically functional combination of such means. In particular, the position of the second portion and of the closure device, in this case arranged on the central facets of the ceiling wall, may in another embodiment be fitted on at least one other facet and even on another wall of the storage structure. Moreover, the orientation given to each of the elements is likely to change 5 depending on the position of the second portion in the tank.

The invention claimed is:

1. A sealed and thermally insulating tank for transport and/or storage of liquefied natural gas, comprising:

at least a supporting structure and a storage structure surrounded by the supporting structure, the storage structure comprising at least a first portion and a second portion which are sealed relative to one another, the first portion and the second portion extending at least partially in the same plane parallel to the supporting structure, the storage structure having a thickness from the outside toward the inside of the tank in a direction perpendicular to the plane of the supporting structure, the tank comprising a closure device arranged at least partially in the thickness of the storage structure, the closure device comprising at least a first closure member and a second closure member configured to interact with one another in such a way as to separate the first portion from the second portion, at least one of the closure members comprising a first part and a second part extending in secant planes, wherein at least one of the parts of one and/or the other of the closure members is connected to at least one of the portions by a securing device arranged in the thickness of the storage structure, and wherein the first closing member and the second closing member have an L shaped profile seen in a section plane passing through the closing device.

2. The tank as claimed in claim 1, wherein at least one of the closure members is secured to the other closure member by at least one weld bead.

3. The tank as claimed in claim 1, wherein the first closure member and/or the second closure member of the closure device are elastically deformable.

4. The tank as claimed in claim 1, wherein one of the closure members is connected to at least one of the portions by the securing device arranged in the thickness of the storage structure, the other closure member being connected to the supporting structure.

5. The tank as claimed in claim 4, wherein the first portion comprises a secondary space and a primary space, the secondary space comprising, successively in the thickness direction from the outside toward the inside of the tank, a secondary thermally insulating barrier adapted to be in contact with the supporting structure and a secondary sealing membrane resting on the secondary thermally insulating barrier, the securing device extending at least partially into the secondary thermally insulating barrier, the primary space comprising, successively in the thickness direction from the outside toward the inside of the tank, a primary thermally insulating barrier which rests on the secondary sealing membrane and a primary sealing membrane resting on the primary thermally insulating barrier and configured to be in contact with a fluid contained in the tank, the second portion comprising a thermally insulating wall adapted to be in contact with the supporting structure and an impermeable membrane resting on the thermally insulating wall and configured to be in contact with the fluid contained in the tank.

6. The tank as claimed in claim 5, wherein the secondary space comprises a securing plate arranged between the secondary thermally insulating barrier and the primary space, the first part of the first closure member being connected to the securing plate by at least one weld bead, the second part of the first closure member being connected to the secondary thermally insulating barrier by the securing device arranged in the thickness of the storage structure.

7. The tank as claimed in claim 5, wherein the supporting structure comprises an insert, the first part of the second closure member being connected to the insert by at least one weld bead, the second part of the second closure member being connected to the secondary thermally insulating barrier by the securing device arranged in the thickness of the storage structure.

8. The tank as claimed in claim 6, wherein at least the secondary space comprises at least one thermally insulating self-supporting panel having an internal face oriented toward the inside of the tank, an external face oriented toward the outside of the tank, and a thickness face extending between the internal face and the external face of the self-supporting panel, the self-supporting panel of the secondary space adjacent to the first closure member comprising a chamfer connecting the internal face and the thickness face of the self-supporting panel.

9. The tank as claimed in claim 8, wherein the thickness face of the self-supporting panel comprises a plywood panel which receives the securing device.

10. The tank as claimed in claim 8, wherein the first closure member comprises a bent part connecting the first part to the second part of the first closure member, the first closure member being positioned against the internal face and the thickness face of the self-supporting panel of the secondary space such that the bent part of the first closure member is arranged in line with the chamfer on the self-supporting panel.

11. A transport and/or storage unit comprising:

at least one of the tank as claimed in claim 1, wherein the transport and/or storage unit is a ship, a barge, a reliquefaction unit, gasification unit, an onshore structure or a gravity platform.

12. A method for assembling a junction zone between the first portion and the second portion of the tank as claimed in claim 5, the method comprising fitting the secondary thermally insulating barrier against the supporting structure.

13. The method for assembling the junction zone as claimed in claim 12, further comprising securing the second part of the first closure member or of the second closure member in a thickness of the secondary thermally insulating barrier by the securing device.

14. The method for assembling the junction zone as claimed in claim 13, wherein the secondary thermally insulating barrier comprises a securing plate, and the method further comprises securing the first part of the first closure member to the secondary thermally insulating barrier at the securing plate by a weld bead.

15. The method for assembling the junction zone as claimed in claim 14, wherein the supporting structure comprises an insert, and the method comprises securing the second part of the second closure member to the second part of the first closure member by a weld bead, and securing the first part of the second closure member to the insert of the supporting structure by another weld bead.

16. The method for assembling the junction zone as claimed in claim 15, further comprising fitting the secondary sealing membrane against the secondary thermally insulating barrier.

17. The method for assembling the junction zone as claimed in claim 16, further comprising fitting the primary thermally insulating barrier against the secondary space, part of the primary thermally insulating barrier partially covering the first part of the first closure member, and the thermally insulating wall is fitted against the supporting structure at least in the main plane of extension of the secondary space, part of the thermally insulating wall being arranged in line with the first part of the second closure member along the thickness.

18. The method for assembling the junction zone as claimed in claim 17, further comprising fitting the primary sealing membrane and the impermeable membrane against the primary thermally insulating barrier and against the thermally insulating wall, respectively, the primary sealing membrane and the impermeable membrane extending in a common plane.

* * * * *